(12) United States Patent
Van Loef

(10) Patent No.: US 6,944,987 B2
(45) Date of Patent: Sep. 20, 2005

(54) FISHING DEVICE SUITABLE FOR COOPERATING WITH A FISHING ROD

(76) Inventor: Marko J. G. Van Loef, Esperenkamp 35, Eindhoven (NL), NL-5632 PX (*) Notice: Subject to any disclaimer, the term of this patent is extended or adjusted under 35 U.S.C. 154(b) by 0 days.

(21) Appl. No.: 10/362,963

(22) PCT Filed: Aug. 27, 2001

(86) PCT No.: PCT/NL01/00622

§ 371 (c)(1),
(2), (4) Date: Dec. 8, 2003

(87) PCT Pub. No.: WO02/15682

PCT Pub. Date: Feb. 28, 2002

(65) Prior Publication Data

US 2004/0083641 A1 May 6, 2004

(30) Foreign Application Priority Data

Aug. 25, 2000 (NL) .............................................. 1016020

(51) Int. Cl.⁷ .............................................. A01K 91/10
(52) U.S. Cl. ........................................................ 43/15
(58) Field of Search ....................................... 43/15, 16

(56) References Cited

U.S. PATENT DOCUMENTS

| | | | | | |
|---|---|---|---|---|---|
| 154,141 A | * | 8/1874 | Hill | ................ | 43/15 |
| 671,914 A | * | 4/1901 | Nesbit | ................ | 43/15 |
| 1,747,033 A | * | 2/1930 | Shireman | ................ | 43/15 |
| 2,552,516 A | * | 5/1951 | Camp et al. | ................ | 43/15 |
| 2,567,340 A | * | 9/1951 | Lytle | ................ | 43/15 |
| 2,590,721 A | * | 3/1952 | Muth | ................ | 43/15 |
| 2,612,713 A | * | 10/1952 | Jenkins | ................ | 43/15 |
| 2,640,290 A | * | 6/1953 | Enos et al. | ................ | 43/15 |
| 2,657,493 A | * | 11/1953 | Coles | ................ | 43/16 |
| 2,659,174 A | * | 11/1953 | Leach | ................ | 43/15 |
| 2,694,875 A | * | 11/1954 | Hoffmann | ................ | 43/15 |
| 2,705,383 A | * | 4/1955 | Hatcher | ................ | 43/16 |
| 2,850,831 A | * | 9/1958 | Setterdahl | ................ | 43/15 |
| 2,851,811 A | * | 9/1958 | Mantell | ................ | 43/15 |
| 3,078,609 A | * | 2/1963 | Efird | ................ | 43/15 |
| 3,401,479 A | * | 9/1968 | Keyes | ................ | 43/16 |
| 4,177,594 A | * | 12/1979 | Kim | ................ | 43/15 |
| 4,944,106 A | * | 7/1990 | Wu et al. | ................ | 43/15 |

FOREIGN PATENT DOCUMENTS

| | | | | |
|---|---|---|---|---|
| CA | 531992 B1 | * | 10/1956 | .......... 43/16 |
| DE | 2263108 B1 | * | 5/1974 | .......... 43/15 |
| DE | 19519673 A1 | * | 11/1995 | |
| FR | 37158 B1 | * | 10/1930 | .......... 43/15 |
| FR | 2 204 349 A | | 5/1974 | |
| FR | 2653639 A1 | * | 5/1991 | |
| GB | 1 448 023 | | 9/1976 | |
| GB | 1527719 A1 | * | 10/1978 | .......... 43/15 |
| GB | 2 026 822 A | | 2/1980 | |
| GB | 1582436 A1 | * | 1/1981 | |
| IT | 475440 B1 | * | 3/1954 | .......... 43/15 |
| JP | 8-56538 B1 | * | 3/1996 | |
| JP | 2000-279077 B1 | * | 10/2000 | |

* cited by examiner

*Primary Examiner*—Darren W. Ark
(74) *Attorney, Agent, or Firm*—Cohen Sakaguchi & English LLP

(57) ABSTRACT

A fishing device 1, for automatically hooking a fish, has a spring 23 that can be tautened and held in a taut condition by a blocking device 37. An end of the spring 23 is coupled to a hook 27 behind which a fishing line, coming from a fishing rod, can be hooked. The fishing line also runs over a sensor 47. If a fish bites the fishing line is pulled taut and the sensor 47 lifts the blocking of the spring 23. Thus the spring 23 loosens, and the hook 27 gives a pull to the fishing line and the fish is hooked. During the hooking the fishing line is held in place by a clamping device 53, and after the fish is hooked the fishing line is released. Thus the reel of the fishing rod can continually stay in the slip position to prevent the fishing rod from being pulled into the water by the fish, to facilitate quick catching of the fish without first having to remove the reel from the blocking position.

16 Claims, 2 Drawing Sheets

FISHING DEVICE SUITABLE FOR COOPERATING WITH A FISHING ROD

This application is a National Stage Filing under 35 USC §371. This application claims priority under 35 USC §365 and any other applicable statutes, to International Application Serial No. PCT/NL01/00622, filed Aug. 27, 2001, which claims priority to Dutch application Serial No. NL 2000 1016020 having a priority date of Aug. 25, 2000. The aforementioned applications are hereby incorporated herein by reference.

BACKGROUND OF THE INVENTION

1. Field of the Invention

The invention relates to a fishing device suitable for cooperating with a fishing rod, for automatically hooking a fish, comprising a frame, a spring device for giving a pull on the fishing line at the moment that a fish pulls on the fishing line, which spring device is coupled to the frame with one end, a blocking device to keep the spring device taut, a deblocking device for deactivating the blocking device at the moment that a fish pulls on the fishing line, and a carrier device for cooperating with a fishing line, which carrier device is coupled to the other end of the spring device.

2. Prior Art

Such a fishing device is known from FR-A-2 204 349. Here a fishing line is led around a sensor and then behind a hook. The hook is connected with a taut spring. The spring is kept taut by a pawl, which is connected to the sensor. If a fish bites the fishing line is pulled and the sensor turns and the pawl releases the spring. The spring loosens with a pull and takes the hook and the fishing line along with it such that the fish is hooked. At the end of the spring motion an arm turns that loosens the fishing line from the hook.

A disadvantage of this known fishing device is that when the spring is released the fishing line is also unwound from the reel of the fishing line. Then the end of the fishing line with the fishhook and the fish on it is pulled less forcefully. Placing the reel in the blocking position can eliminate this disadvantage. However, this has the disadvantage that after hooking a fish the fish can pull the entire fishing rod into the water if the fishing rod is not grasped in time.

SUMMARY OF THE INVENTION

An objective of the invention is to provide a fishing device of the type described in the preamble where the disadvantage of the known fishing device that is mentioned above is not present. To this end the fishing device according to the invention is characterized in that the fishing device also comprises a clamping device, which is connected to the frame for clamping a fishing line, as well as a loosening device for deactivating the clamping device, which loosening device is activated when the carrier device is moved, preferably near or at the end of the movement of the carrier device. With cooperation with a fishing rod that has a reel on which fishing line is wound, the clamping device must clamp the fishing line between the reel and the carrier device.

Here, during the hooking of the fish the fishing line cannot be unwound from the reel by the presence of the clamping device. In addition, after the fish is hooked the fishing line can be unwound from the reel by making use of the slip position of the reel, since the loosening device releases the clamping device after the fish is hooked. In addition, the landing of the fish is made easier with the aid of the reel because the reel does not need to first be removed from the blocking position but can also remain in the slip position while the fish is hooked.

To facilitate the tautening of the fishing line during the clamping of the fishing line, an embodiment of the fishing device according to the invention is characterized in that the clamping device is preferably adjustable in two sections, a first section where the fishing line is enclosed and is only moveable lengthwise on behalf of the tautening of the fishing line, and a second section where the fishing line is clamped tightly.

In a practical embodiment the loosening device comprises a moveable stop against which the carrier device stop, which stop is coupled via a coupling device to the clamping device, and which stop releases the clamping when moved.

As mentioned, it is desirable that after the fish is hooked the fishing line be released, so that the angler can use his fishing rod to land the fish. To release the fishing line an embodiment of the fishing device according to the invention is characterized in that the carrier device comprises a hook that can turn over.

For small fish a smaller tug is required than for large fish. To be able to adjust the size or length of the tug a further embodiment is characterized in that the place where the hook can turn over is adjustable.

A practical embodiment of the fishing device according to the invention is characterized in that the frame comprises a tube, the spring device comprises a spring that can be moved in the tube, and the carrier device comprises a sliding element that can be moved in the tube, which is connected to the spring and on which the hook is fastened and can turn, whereby the hook is kept from turning by an upper wall of the tube and can turn at the site of the opening in the upper wall of the tube.

When fishing for large fish a larger tug on the fishing line is desired than when fishing for small fish. So preferably the length of the tug should be adjustable. To this end the opening in the upper wall of the tube extends over a large part of the length, and the frame also has an element that can be slid over the tube, which also has an opening, whereby the hook is also kept from turning by the upper wall of the element, and can only turn at the site of the opening in the element.

An embodiment of the fishing device according to the invention is characterized in that the fishing device comprises a release device for releasing the fishing line after the spring device has loosened. This has the advantage that when the fish is landed, the fishing line need not be loosened first from the fishing device.

Preferably the carrier device and/or the loosening device are part of the release device.

A further embodiment of the fishing device according to the invention is characterized in that the deblocking device comprises a sensor, which during use is in contact with the fishing line and when tautening the fishing line moves and thus pulls the blocking device away.

When large fish are caught in wild water the sensor should move when there is more pulling strength in the fishing line than when catching smaller fish in calm water. To make this possible, the sensor has a line guide element, which can be moved along the sensor. By moving the line guide element, the length of the arm changes on which the pulling force in the fishing line works, such that the lever function is influenced.

To be better able to adjust the force that is required to move the blocking device, the sensor is preferably moveable against a spring force, and the deblocking device comprises an adjusting feature for adjusting this spring force.

Yet another embodiment of the fishing device according to the invention is characterized in that the fishing device also comprises a line feed system, which line feed system comprises a protrusion that is present on the upper wall of the tube on one side of a slot in the tube via which the fishing line is led to the carrier device, and which line feed system also comprises two other protrusions that are also on the tube on the other side of the slot and that stick out past the side walls of the tube. How this line feed system can be used will be explained below using the drawings.

BRIEF DESCRIPTION OF THE DRAWINGS

The invention will be elucidated more fully below on the basis of drawings in which an embodiment of the fishing device according to the invention is shown. In these drawings.

DETAILED DESCRIPTION OF THE DRAWINGS

Figure 1:
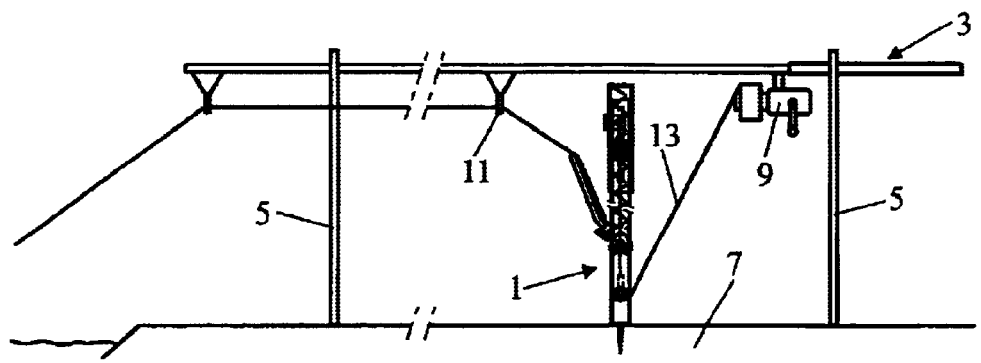
FIG. 1 shows a fishing set-up where an embodiment of the fishing device according to the invention cooperates with a fishing rod.

In FIG. 1 a fishing set-up is shown in which an embodiment of the fishing device 1 according to the invention cooperates with a fishing rod 3. The fishing rod 3 is placed on two posts 5 and the fishing device 1 is placed in the ground 7 between the reel 9 and a first subsequent guide ring 11 of the fishing rod 3. If desired, the fishing device 1 can also be placed elsewhere, for example between two guide rings, and the fishing device 1 can be fastened for example to the fishing rod instead of in the ground. The fishing device 1 works only together with the fishing line 13 of the fishing rod 3. Thus the fishing device 1 can work with any fishing rod at all. The fishing line 13 is pulled from the fishing rod 3 and coupled to the fishing device 1.

Figure 2:
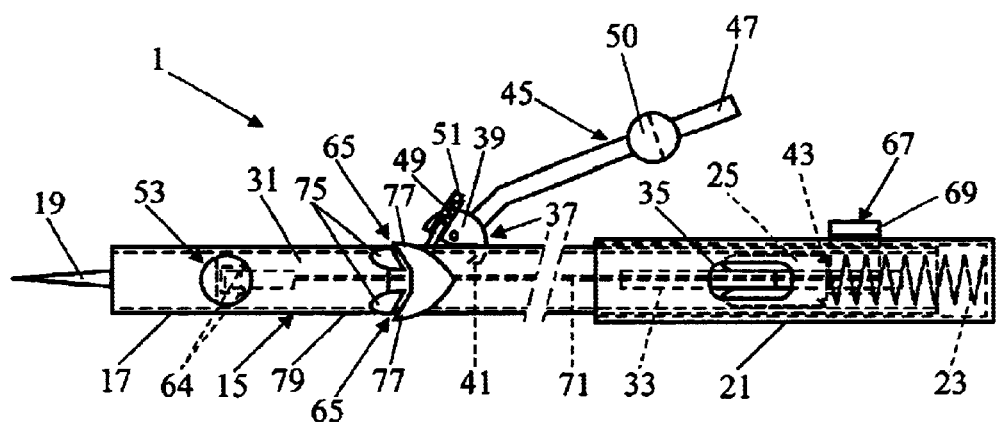
FIG. 2 shows a front view of the fishing device before the fishing line is coupled to it and in a non-tautened condition.
Figure 3:
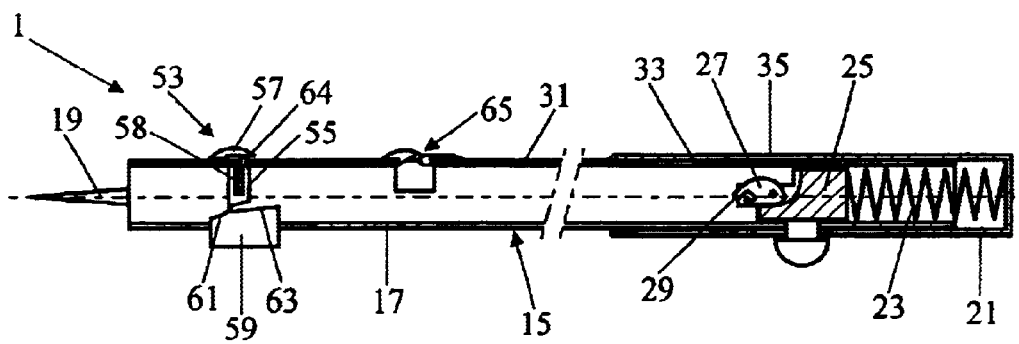
FIG. 3 shows a longitudinal cross-section of the fishing device in a non-tautened condition.
Figure 4:
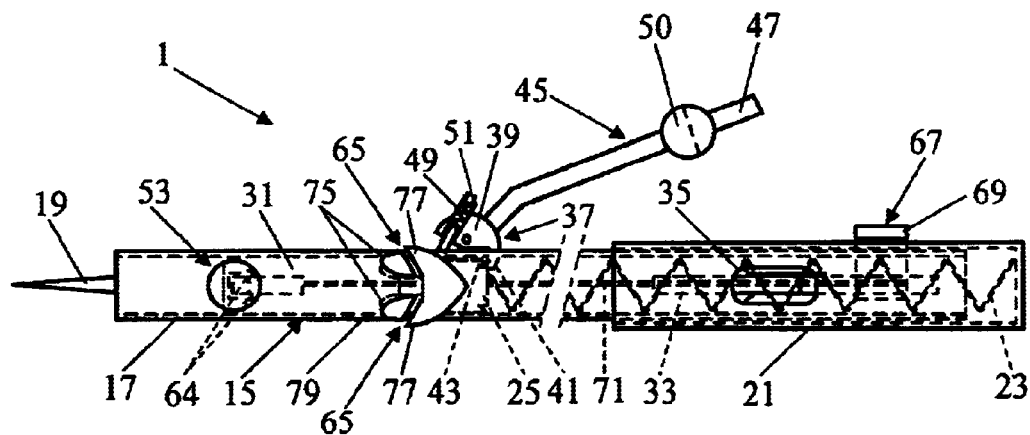
FIG. 4 shows a front view of the fishing device after the fishing line is coupled to it and in a tautened condition.
Figure 5:
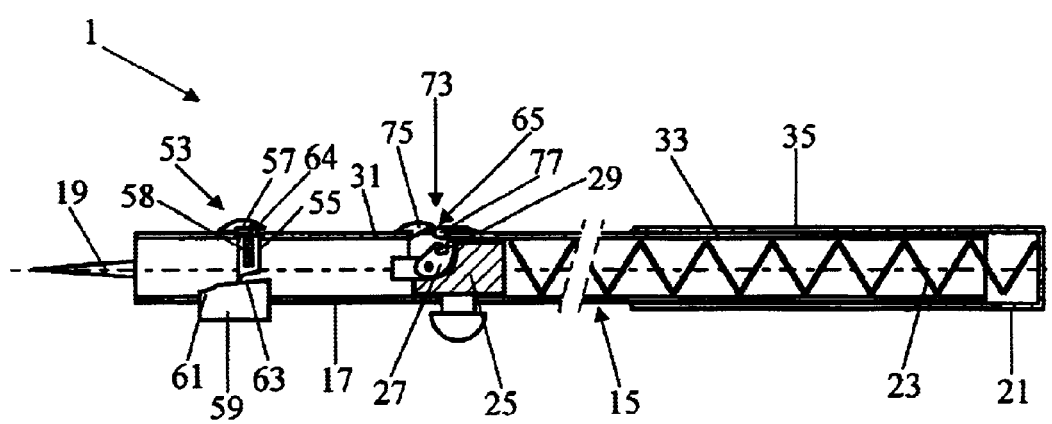
FIG. 5 shows a longitudinal cross-section of the fishing device in a tautened condition.

FIGS. 2 and 3 show the fishing device before the fishing line is coupled to it and in a non-tautened condition. FIGS. 4 and 5 show the fishing device after the fishing line is coupled to it and in a tautened condition. The fishing device 1 has a frame 15 consisting of a rectangular tube 17, which has at one end a pin 19 for placing in the ground 7. The fishing device 1 also has an element that can be shifted with respect to the tube 17, which in this example is a sleeve 21 that can go over the tube 17.

In the tube 17 there is a spring device, which is formed by a draw spring 23. The draw spring 23 is fastened with an end to the end of the sleeve 21. It is, however, also possible that the draw spring 23 is fastened to the end of the tube 17 instead of to the sliding sleeve 21. At the other end of the draw spring 23 there is a sliding element 25, which can be moved in the tube 17. The sliding element 25 has a carrier element connected to it, which is executed as a hook 27. The hook 27 can be turned between a first position in which a fishing line can be pulled along (see FIGS. 4 and 5), and a second position where the hook releases the fishing line (see FIGS. 2 and 3). The hook 27 has a lip 29, which is in contact with an upper wall 31 of the tube 17 and blocks the hook 27 against turning from the first position to the second position.

In the non-tautened position of the draw spring 23 (see FIGS. 2 and 3) the hook 27 is across from a part of a long opening 33 in the tube 17 and an opening 35 in the sleeve 21. Between the hook 27 and the sliding element 25 there is a light further spring (not shown), which pulls the hook 27 into the first position. Only at the site of the opening 35 in the sleeve 21 can the hook 27 turn. Because the sleeve 21 can be slid over the tube 17, the place where the hook 27 can turn, and thus the fishing line can be released, is adjustable. The place of the opening 35 in the sleeve 21, therefore, determines the distance over which the fishing line is pulled and thus the length of the hooking motion.

On the tube 17 there is a blocking device 37 to keep the draw spring 23 in the tautened condition. The blocking device 37 is formed by a turning blocking element 39, which has a blocking pawl 41 that holds onto a notch 43 in the sliding element 25. The blocking element 39 comprises a deblocking device 45 to pull away the blocking device 37 at the moment that a fish pulls on the fishing line. A sensor 47, which leads the fishing line at the free end, forms the deblocking device 45. When the fishing line is pulled taut the sensor 47 turns the blocking device 37, such that the blocking pawl 41 is pulled out of the notch 43 and the sliding element 25 is released. The deblocking device 45 is part of the release device, which completely releases the fishing line after the spring device has loosened.

Between the turning blocking element 39 and the upper wall 31 of the tube 17 there is a compression spring 49, the prestress of which can be set by an adjusting feature. The adjusting feature is formed by a setscrew 51. Thus the pulling force in the fishing line with which the blocking of the spring is released and the hooking of the fish takes place can be adjusted.

To further adjust the pulling force in the fishing line with which the blocking of the spring is released, on the sensor there is a line guide element 50, which can be moved along the sensor. By moving the line guide element 50 the place on the sensor on which the pulling force in the fishing line works is changed, such that the lever function is influenced.

On the tube 17 there is also a clamping device 53 for clamping the fishing line 13, which comes from the reel 9 of the fishing rod 3 (see FIG. 1). With this clamping device 53 it can be prevented that during the hooking of the fish the fishing line 13 is unwound from the reel 9, such that the hooking length is decreased. The clamping device 53 comprises a moveable clamp element 55, which can clamp the fishing line against another fixed clamp element 57 (see FIGS. 3 and 5). Between the moveable and fixed clamp element there is a spring 58 that when the fishing line is released presses the two clamping devices away from each other. A sliding button 59 can move the moveable clamp element 55. The clamping device 53 is adjustable in two sections by two different cam profiles 61 and 63 on the sliding button 59. In a first section two pins 64 are moved on the moveable clamp element 55 in two holes in the fixed clamp element 57. In this position the fishing line is enclosed between the two pins 64 and the fixed clamp element 57 and the line can still be pulled taut behind the pins 64 (see FIG. 3). In the second section the fishing line is clamped in between the two clamp elements 55 and 57 (see FIG. 5).

The adjustment of the fishing device 1 goes like this. First the sliding element 25 is pulled down. Now the blocking device 37 turns, such that the blocking pawl 41 comes in the notch 43 of the sliding element 25. Then the angler pulls the fishing line out of the fishing rod, hooks this via slots 65 behind the hook 27 and places it over the sensor 47. Then the button 59 of the clamping device 53 is moved over the first section, and pulling on the side of the reel 9 on the fishing line 13 pulls the fishing line 13 taut. Then the fishing line is clamped securely by sliding the button 59 over the second section. Now the fishing device 1 is set.

On the tube 17 there is also a loosening device 67 for deactivating the clamping device 53. The loosening device 67 is activated at the end of the hooking motion by the sliding element 25. To this end the loosening device 67 has a sliding stop 69, which is present on the sliding sleeve 21, and a coupling device, which connects the stop 69 and the button 59 with each other. The coupling device in this example is formed by a pawl 71. At the end of the spring motion the sliding element 25 goes against the stop 69, which thus slides a bit and then pulls the button 59 away via the pawl 71. By the spring 58 between the clamp element 55 and the tube 17 the moveable clamp element 55 is pushed away from the fixed clamp element 57 and the fishing line is released. The loosening device 67 is also part of the release device mentioned above.

The working of the fishing device 1 is as follows. If after the adjustment of the fishing device a fish bites, there will be a pull on the fishing line. Then the sensor 47 will be moved and the blocking element 39 will turn, such that the sliding element 25 is released. Then the draw spring 23 will loosen and it will pull the sliding element 25 through the tube 17. The hook 27 on the sliding element 25 pulls the fishing line along. When the draw spring 23 is released, suddenly a great force will be exerted on the fishing line. The pins 64 first of all compensate for the sudden great force in the fishing line and thus release the clamping of the fishing line.

Near the end of the spring motion, at the site of the opening 35 in the sleeve 21, the hook 27 turns over through the resistance that it experiences from the fishing line. In addition, the sliding element 25 goes against the stop 69 at the end of the spring motion, such that the clamping device 53 can release the fishing line. The fishing line is now free and is pulled by the fish from the fishing device 1. The angler can then pick up his fishing rod 3 and land the fish, without having to first take the fishing line 13 from the fishing device 1.

To make the hooking of the fishing line behind the hook 27 via the slots 65 easier, the fishing device 1 has a line feed system 73. The line feed system 73 has two protrusions 75 that are present on the upper wall 31 of the tube 17 on one side of the slots 65 in the tube. The line feed system 73 also has two other protrusions 77 that are also on the tube 17 on the other side of the slots 65 and that stick out past the side walls 79 of the tube 17.

At the adjustment of the fishing device 1 the fishing line is slid over the upper wall 31 of the tube 17 in the direction of the pin 19 until the fishing line comes via the slots 65 under the protrusions 75. The fishing line is held on each side wall 79 of the tube 17 and extends crosswise over the tube. Subsequently, the fishing line is shifted in the opposite direction until up against lip 29. Then the fishing line is brought downward to behind the hook 27. Finally, the pieces of fishing line sticking out of the tube are brought upward where they hook behind the protrusions 77 and are led via these protrusions 77 to the centre of the tube 17. Then a piece of the fishing line can be placed over the sensor 47 and the other piece can be brought through the clamping device 53.

Although in the above the invention is explained on the basis of the drawings, it should be noted that the invention is in no way limited to the embodiment shown in the drawings. The invention also extends to all embodiments deviating from the embodiment shown in the drawings within the context defined by the claims.

The spring device for example can also be formed by an air spring. During the 'tautening' a piston compresses air in a chamber. In this 'tautened' condition the piston is blocked. The piston has a moveable hook. On 'release' the air pressure moves the piston and the hook takes the fishing line along.

The sliding sleeve is not necessary for the working of the fishing device but is useful for its better functioning. If the sliding sleeve is not used, instead of a long opening a small opening should be present near the free end of the tube to facilitate the turning over of the hook. The place where the hook then turns over is not adjustable.

The clamping device need not be adjustable in two sections. If the clamping device is only adjustable between a release and a clamp position and cannot fulfill a holding function, so that the fishing line is moveable, the holding function should be fulfilled by other means, for example by hooks that are placed near the clamping device on the side walls of the tube.

It is also clear that the fishing device can also be used independently, that is to say without working with a fishing rod. This is for example favourable in fishing on frozen water via a hole in the ice. Here it is not useful to use a fishing rod and one can only work with the fishing device. After being hooked the fish can be landed by hand by pulling on the fishing line.

What is claimed is:

1. A fishing device suitable for cooperating with a fishing rod, for automatically hooking a fish, comprising a frame, a spring device for giving a pull on the fishing line at the moment that a fish pulls on the fishing line, the spring device is coupled to the frame with one end of the spring device, a blocking device to keep the spring device taut and which is connected to the frame, a deblocking device connected to the blocking device for deactivating the blocking device at the moment that a fish pulls on the fishing line, and a carrier device for cooperating with a fishing line, the carrier device is coupled to the other end of the spring device, characterized in that the fishing device also comprises a clamping device, which is directly connected to the frame for clamping a fishing line, as well as a loosening device connected to the frame for deactivating the clamping device, which loosening device is activated when the carrier device is moved.

2. The fishing device according to claim 1, characterized in that the clamping device is adjustable in two sections, a first section where the fishing line is enclosed and a second section where the fishing line is clamped tightly.

3. The fishing device according to claim 1, characterized in that the loosening device comprises a moveable stop against which the carrier device stops, the stop is coupled via a coupling device to the clamping device, and the stop releases the clamping device when it is moved.

4. The fishing device according to claim 1, characterized in that the carrier device comprises a hook that can turn over such that the fishing line is released.

5. The fishing device according to claim 4, characterized in that the frame comprises a tube, the spring device comprises a spring that can be moved in the tube, and the carrier device comprises a sliding element that can be moved in the tube, which is connected to the spring and on which the hook is fastened and can turn, whereby the hook is kept from turning by an upper wall of the tube and can turn at an opening in the upper wall of the tube.

6. The fishing device according to claim 5, characterized in that the opening in the upper wall of the tube extends over a large part of the length of the tube, and the frame also has an element that can be slid over the tube, which also has an opening, whereby the hook is also kept from turning by an upper wall of the element, and can only turn at the opening in the element.

7. The fishing device according to claim 5, characterized in that the fishing device also comprises a line feed system, which line feed system comprises a protrusion that is present on an upper wall of the tube on one side of a slot in the tube via which the fishing line is led to the carrier device, and which line feed system also comprises two other protrusions that are also on the tube on the other side of the slot and that stick out past side walls of the tube.

8. The fishing device according to claim 1, characterized in that the fishing device comprises a release device for releasing the fishing line after the spring device has loosened.

9. The fishing device according to claim 8, characterized in that the carrier device is part of the release device.

10. The fishing device according to claim 8, characterized in that the loosening device is part of the release device.

11. The fishing device according to claim 1, characterized in that the deblocking device comprises a sensor, which during use is in contact with the fishing line and when tautening the fishing line moves and thus pulls the blocking device away.

12. The fishing device according to claim 11, characterized in that there is a line guide element present on the sensor, which can be moved along the sensor.

13. The fishing device according to claim 11, characterized in that the sensor can be moved against a spring force, and that the deblocking device comprises an adjusting feature for adjusting this spring force.

14. The fishing device according to claim 1, characterized in that the frame comprises a tube and the fishing device also comprises a line feed system, which line feed system comprises a protrusion that is present on an upper wall of the tube on one side of a slot in the tube via which the fishing line is led to the carrier device, and which line feed system also comprises two other protrusions that are also on the tube on the other side of the slot and that stick out past the side walls of the tube.

15. The fishing device of claim 1, wherein the loosening device is activated when the carrier device is moved near the end of the movement of the carrier device.

16. The fishing device according to claim 1, characterized in that the frame comprises a tube, the spring device comprises a spring that can be moved in the tube, and the carrier device comprises a sliding element that can be moved in the tube, which is connected to the spring and on which a hook is fastened and can turn, whereby the hook is kept from turning by an upper wall of the tube and can turn at an opening in the upper wall of the tube.

* * * * *